T. S. BROWN.
Seat for Harvesters.
No. 54,245.
Patented April 24, 1866.
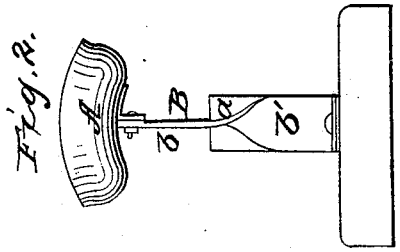
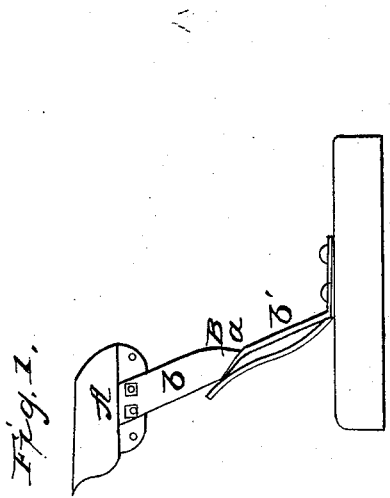

UNITED STATES PATENT OFFICE.

THOMAS S. BROWN, OF POUGHKEEPSIE, NEW YORK, ASSIGNOR TO HIMSELF AND JOHN P. ADRIANCE, OF SAME PLACE.

IMPROVEMENT IN SEATS FOR HARVESTERS, &c.

Specification forming part of Letters Patent No. 54,245, dated April 24, 1866.

*To all whom it may concern:*

Be it known that I, THOMAS S. BROWN, of Poughkeepsie, Dutchess county, State of New York, have invented a new and Improved Seat for Agricultural Implements; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a front view of the same.

Similar letters of reference indicate like parts.

This invention relates to a new and improved driver's seat for agricultural implements, and is more especially designed for the seats of reaping and mowing machines, although applicable to other agricultural implements which are mounted on wheels.

The object of this invention is to obtain, by a very simple and inexpensive means, a seat which will yield or give in two different directions—that is to say, laterally, as well as obliquely—up and down; and to this end the invention consists in having the spring or elastic bar to which the seat is attached bent or otherwise constructed so that it will have two parts, which will yield or give in planes at right angles with each other, and thereby admit of the seat yielding in any direction.

A represents the driver's seat, and B the spring or elastic support, to the upper end of which the seat is attached, the lower end of said support being firmly secured to the implement. The spring or elastic support B is, in this instance, composed of a single flat bar of steel or other suitable elastic metal, steel being probably preferable, the bar being twisted at about its center, as shown at $a$, so that the broad surface of the upper part, $b$, above the twist, will be about at right angles with the broad surface of the part $b'$ below the twist. The lower part, $b'$, has its broad side facing the front of the machine, and springs or yields so as to admit of the seat rising and falling in a vertical curve, while the upper part, $b$, admits of the lateral yielding of the seat. Thus the seat, by these two elastic or yielding parts of the spring-support, will be allowed to yield or give in any direction.

From the above description it will be seen that the spring or elastic support need not be formed out of a single bar or piece. It may be composed of two separate or distinct parts, $b\ b'$, connected to a head or bar, but in the same relative position, to wit, at right angles with each other. The same result will be attained in either case.

Having thus described my invention, what I claim as new, and desire to secure by Letters Patent, is—

Constructing the support B of rider's seat for harvesters, mowing-machines, and other agricultural implements of a spring bar or plate twisted in such manner that the support will yield or give in two different planes at right angles with each other and admit of the yielding of the seat in any direction, substantially as set forth.

THOMAS S. BROWN.

Witnesses:
 ROBT. N. PALMER,
 J. R. B. VARIED.